(12) United States Patent
Sakimura et al.

(10) Patent No.: US 7,564,538 B2
(45) Date of Patent: Jul. 21, 2009

(54) MEASURING SYSTEM

(75) Inventors: Ritsuo Sakimura, Columbus, OH (US);
Hajime Sinozaki, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/901,379

(22) Filed: Sep. 17, 2007

(65) Prior Publication Data

US 2008/0074638 A1   Mar. 27, 2008

(30) Foreign Application Priority Data

Sep. 27, 2006   (JP) .............................. 2006-263440

(51) Int. Cl.
*G01C 3/08* (2006.01)
*G01C 1/00* (2006.01)
(52) U.S. Cl. ................................. 356/4.01; 356/141.1
(58) Field of Classification Search ....... 356/4.01–5.15, 356/139, 1, 139.04, 139.05, 141.1
See application file for complete search history.

(56) References Cited

U.S. PATENT DOCUMENTS

| 4,227,261 | A | * | 10/1980 | Robertsson | ................. | 398/169 |
| 5,100,229 | A | | 3/1992 | Lundberg et al. | .............. | 356/1 |
| 5,313,409 | A | * | 5/1994 | Wiklund et al. | ................. | 356/4.01 |
| 7,022,962 | B2 | | 4/2006 | Ohtomo et al. | .......... | 250/206.1 |
| 7,098,997 | B2 | * | 8/2006 | Shirai et al. | ................. | 356/3.01 |
| 7,110,102 | B2 | | 9/2006 | Ohtomo et al. | .......... | 356/141.4 |
| 7,310,137 | B2 | * | 12/2007 | Nichols | ................. | 356/139.01 |
| 7,345,748 | B2 | * | 3/2008 | Sugiura et al. | ......... | 356/139.04 |
| 2005/0211882 | A1 | | 9/2005 | Ohtomo et al. | ............. | 250/221 |

FOREIGN PATENT DOCUMENTS

| EP | 0 257 525 | 3/1988 |
| EP | 1 503 176 | 2/2005 |
| JP | 2003-214852 | 7/2003 |
| JP | 2004-212058 | 7/2004 |
| JP | 2006-337302 | 12/2006 |
| WO | 2006/132060 | 12/2006 |

* cited by examiner

*Primary Examiner*—Isam Alsomiri
(74) *Attorney, Agent, or Firm*—Nields, Lemack & Frame, LLC

(57) ABSTRACT

The present invention provides a measuring system, which comprises a surveying device installed at a known point, at least one photodetection device to be installed at a measuring point, and a main arithmetic device; wherein the surveying device projects by rotary irradiation a reference plane forming laser beam including two or more fan-shaped laser beams with at least one of the fan-shaped laser beams tilted and a distance measuring light performs distance measurement by receiving a reflected distance measuring light, and performs communication of the distance measurement data between the photodetection device and the main arithmetic device; wherein the photodetection device calculates an elevation angle with respect to the surveying device based on a photodetection signal issued by receiving the reference plane forming laser beam, calculates an elevation position based on the elevation angle and the distance to the surveying device, and performs communication of distance measurement data and elevation position data at least with the main arithmetic device; and wherein the main arithmetic device communicates at least with the photodetection device among the surveying device and the photodetection device, and collects and records surveying data such as distance measurement data, elevation position data, etc. for each measuring point.

8 Claims, 14 Drawing Sheets ic unit for calculating an elevation angle with respect to the surveying device based on a photodetection signal issued, when the reference plane forming laser beam is received by the photodetection unit and for calculating an elevation position based on the elevation angle and the distance to the surveying device, a photodetection side radio communication unit for performing communication of distance measurement data and elevation position data at least with the main arithmetic device among the main arithmetic device and other photodetection devices; and wherein the main arithmetic device comprises a main radio communication unit being able to communicate at least with the photodetection device among the surveying device and the photodetection device, and a main storage unit for collecting and recording surveying data such as distance measurement data, elevation position data, etc. for each measurement point. Also, the present invention provides the measuring system as described above, wherein the main arithmetic device has a main control arithmetic unit, wherein the main control arithmetic unit issues an instruction signal for starting measurement to the surveying device via the main radio communication unit and transmits position information of the measuring points to the photodetection device via the main radio communication unit. Further, the present invention provides the measuring system as described above, wherein the photodetection device receives distance measurement data transmitted from the surveying device at real time, and transmits the distance measurement data and the elevation position data to the main arithmetic device when the received distance measurement data conforms with the position information. Also, the present invention provides the measuring system as described above, wherein the photodetection device has a photodetection side display unit, wherein a guidance direction is displayed on the photodetection side display unit based on deviation of the measurement data of the photodetection device itself from the position information at the measuring point, and, when the position information of the measuring point conforms with the measurement data of the photodetection device itself, the distance measurement data and the elevation position data are transmitted to the main arithmetic device. Further, the present invention provides the measuring system as described above, wherein the main arithmetic device has a main control arithmetic unit, wherein operation data is stored in the main storage unit, the main control arithmetic unit transmits a guidance information to the photodetection device based on the position information of the measuring point obtained from operation data and the result of distance measurement of the photodetection unit measured by the surveying device, and a guidance direction is displayed on a photodetection side display unit of the photodetection device. Also, the present invention provides the measuring system as described above, wherein the main arithmetic device can select a first mode, a second mode, and a third mode; and in the first mode, an instruction signal for starting measurement is issued to the surveying device via the main radio communication unit, a position information at the measuring point is transmitted to the photodetection device via the main radio communication unit, the photodetection device receives distance measurement data transmitted from the surveying device at real time, and the distance measurement data and the elevation position data are transmitted to the main arithmetic device when the received distance measurement data conforms with the position information; in the second mode, an instruction signal for starting measurement is issued to the surveying device via the main radio communication unit, a position information of the measuring point is transmitted to the photodetection device via the main radio communication unit, a guidance direction

MEASURING SYSTEM

BACKGROUND OF THE INVENTION

The present invention relates to a measuring system to be used when surveying operation is performed by one operator or through cooperative activities of two or more surveying operators.

In the surveying operation, which is carried out in civil engineering projects, e.g. in road construction work, such operations are carried out as measurement of positions on both sides of road, measurement of elevation (high-low) difference, measurement of road width, etc. In this sense, surveying operation is cooperative work by a plurality of surveying operators.

In the past, when surveying operation is performed by using a total station, piles are driven at a predetermined distance (e.g. 10 m or 20 m) along both sides of road. An assistant surveyor holds an object to be measured (e.g. a pole with a prism mounted on the pole) at a point where a pile is to be driven. A skilled surveyor (a chief surveyor) performs surveying operation on the object to be measured from the total station side, and the surveying data is collected at each of the points where the piles are driven.

In the surveying method using a total station as described above, instructions on surveying operation are given from a skilled surveyor to an assistant surveyor. This means that the operation is carried out on one person to one person basis, and the working efficiency is low. The assistant surveyor must have certain knowledge on surveying operation and surveying techniques, and this leads to such a problem as higher cost for the surveying operation.

At an operation site of a small-scale construction project, for instance, it is often difficult to have an assistant surveyor with sufficient surveying knowledge and surveying technique, and a single surveyor must sometimes execute at the same time the duties of a skilled surveyor, the duties of an engineer at the working site and the duties as a superintendent at the construction site. As a result, the operation requires complicated procedure and is not very efficient.

SUMMARY OF THE INVENTION

It is an object of the present invention to provide a measuring system, by which it is possible to acquire surveying data in simpler and easier manner without requiring sufficient knowledge and technique of surveying operation and to improve the working efficiency and to reduce the surveying cost.

To attain the above object, the present invention provides a measuring system, which comprises a surveying device installed at a known point, at least one photodetection device to be installed at a measuring point, and a main arithmetic device; wherein the surveying device comprises a laser beam projecting unit for projecting by rotary irradiation a reference plane forming laser beam including two or more fan-shaped laser beams with at least one of the fan-shaped laser beams tilted and a distance measuring light, a distance measuring unit for performing distance measurement by receiving a reflected distance measuring light from the photodetection device, and a radio communication unit for performing communication of the distance measurement data between the photodetection device and the main arithmetic device; wherein the photodetection device comprises a reflection unit for reflecting the distance measuring light toward the surveying device, a photodetection unit for receiving the reference plane forming laser beam, a photodetection side control arithis displayed on a photodetection side display unit of the photodetection device based on deviation of the measurement data of the photodetection device itself from the position information of the measuring point, and, when the position information of the measuring point conforms with the measurement data of the photodetection device itself, the distance measurement data and the elevation position data are transmitted to the main arithmetic device; and in the third mode, operation data is stored in the main storage unit, and a guidance information is transmitted to the photodetection device based on the position information of the measuring point obtained from the operation data and the result of distance measurement of the photodetection device determined by the surveying device, and a guidance direction is displayed on the photodetection side display unit.

According to the present invention, there are provided a surveying device installed at a known point, at least one photodetection device to be installed at a measuring point, and a main arithmetic device, and the surveying device comprises a laser beam projecting unit for projecting by rotary irradiation a reference plane forming laser beam including two or more fan-shaped laser beams with at least one of the fan-shaped laser beams tilted and a distance measuring light, a distance measuring unit for performing distance measurement by receiving a reflected distance measuring light from the photodetection device, and a radio communication unit for performing communication of the distance measurement data between the photodetection device and the main arithmetic device, and the photodetection device comprises a reflection unit for reflecting the distance measuring light toward the surveying device, a photodetection unit for receiving the reference plane forming laser beam, a photodetection side control arithmetic unit for calculating an elevation angle with respect to the surveying device based on a photodetection signal issued when the reference plane forming laser beam is received by the photodetection unit and for calculating an elevation position based on the elevation angle and the distance to the surveying device, a photodetection side radio communication unit for performing communication of distance measurement data and elevation position data at least with the main arithmetic device among the main arithmetic device and other photodetection devices, and the main arithmetic device comprises a main radio communication unit being able to communicate at least with the photodetection device among the surveying device and the photodetection device, and a main storage unit for collecting and recording surveying data including distance measurement data, elevation position data, etc. for each measurement point. This makes it possible to easily collect the data obtained at each measuring point and at each photodetection device and to improve the efficiency of the surveying operation.

Also, according to the present invention, the main arithmetic device has a main control arithmetic unit, wherein the main control arithmetic unit issues an instruction signal for starting measurement to the surveying device via the main radio communication unit and transmits position information of the measuring points to the photodetection device via the main radio communication unit. As a result, the instructions and the communications between the surveyor and the assistant surveyor can be given and taken in easier and reliable manner, and surveying operation can be performed smoothly and efficiently by a plurality of surveyors.

Further, according to the present invention, the photodetection device receives distance measurement data transmitted from the surveying device at real time, and transmits the distance measurement data and the elevation position data to the main arithmetic device when the received distance measurement data conforms with the position information. This makes it possible to automatically collect the measurement data at the measuring points and to improve working efficiency.

Also, according to the present invention, the photodetection device has a photodetection side display unit, and a guidance direction is displayed on the photodetection side display unit based on deviation of the measurement data of the photodetection device itself from the position information at the measuring point, and, when the position information of the measuring point conforms with the measurement data of the photodetection device itself, the distance measurement data and the elevation position data are transmitted to the main arithmetic device. As a result, assistant surveyors can be guided easily. The assistant surveyors should only move in guidance direction, which is displayed on the photodetection side display unit, and even those who do not have sufficient knowledge or experience in surveying technique can perform surveying operation.

Further, according to the present invention, the main arithmetic device has a main control arithmetic unit, and the operation data is stored in the main storage unit, the main control arithmetic unit transmits a guidance information to the photodetection device based on the position information of the measuring point obtained from operation data and the result of distance measurement of the photodetection unit measured by the surveying device, and a guidance direction is displayed on a photodetection side display unit of the photodetection device. As a result, the assistant surveyors should only move in guidance direction, which is displayed on the photodetection side display unit, and even those who do not have sufficient knowledge or experience in surveying technique can perform surveying operation. The surveyor who operates the main arithmetic device should only give the instruction to start the surveying operation. This reduces the efforts and the burdens on those who engage in the surveying operation.

Also, according to the present invention, the main arithmetic device can select a first mode, a second mode, and a third mode; and in the first mode, an instruction signal for starting measurement is issued to the surveying device via the main radio communication unit, a position information at the measuring point is transmitted to the photodetection device via the main radio communication unit, the photodetection device receives distance measurement data transmitted from the surveying device at real time, and the distance measurement data and the elevation position data are transmitted to the main arithmetic device when the received distance measurement data conforms with the position information; in the second mode, an instruction signal for starting measurement is issued to the surveying device via the main radio communication unit, a position information of the measuring point is transmitted to the photodetection device via the main radio communication unit, a guidance direction is displayed on a photodetection side display unit of the photodetection device based on deviation of the measurement data of the photodetection device itself from the position information of the measuring point, and, when the position information of the measuring point conforms with the measurement data of the photodetection device itself, the distance measurement data and the elevation position data are transmitted to the main arithmetic device; and in the third mode, operation data is stored in the main storage unit, and a guidance information is transmitted to the photodetection device based on the position information of the measuring point obtained from the operation data and the result of distance measurement of the photodetection device determined by the surveying device, and a guidance direction is displayed on the photodetection side display unit. As a result, optimal surveying operation mode can be selected to suit the type of persons who engage in the surveying operation. This leads to more effective and efficient execution of the surveying operation.

DETAILED DESCRIPTION OF THE PREFERRED EMBODIMENT

Description will be given below on the best mode when the present invention is carried out by referring to the attached drawings.

First, referring FIG. 1 and FIG. 2, description will be given on general features of a measuring system in an embodiment of the invention.

Figure 1:
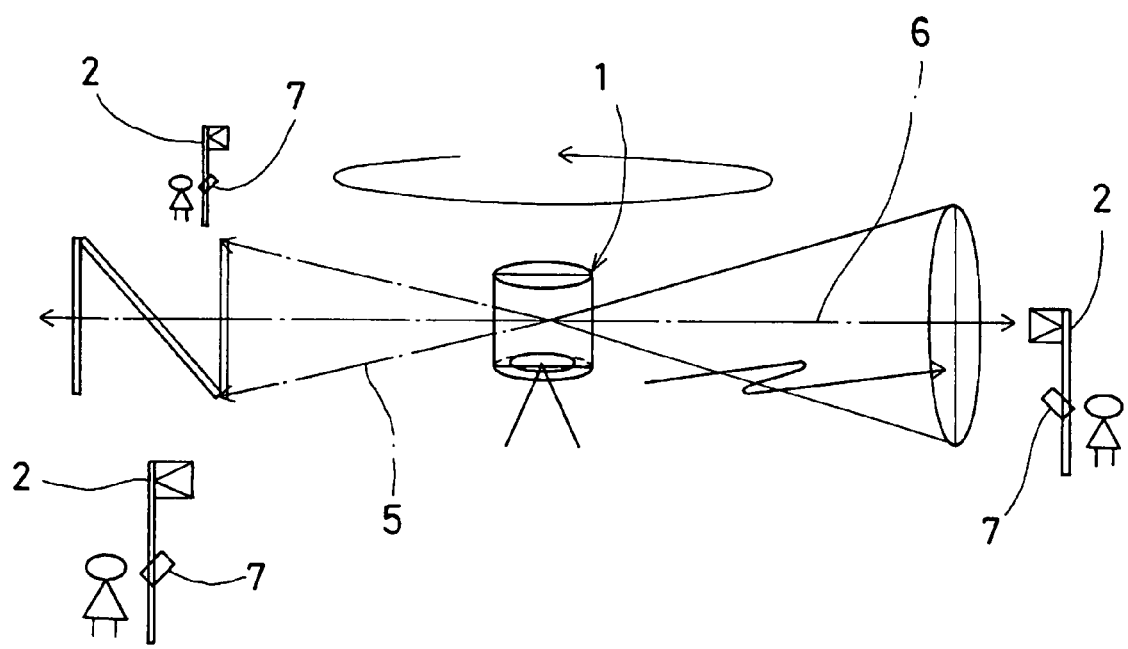
FIG. 1 is a schematical drawing to show an embodiment of the present invention.
Figure 2:
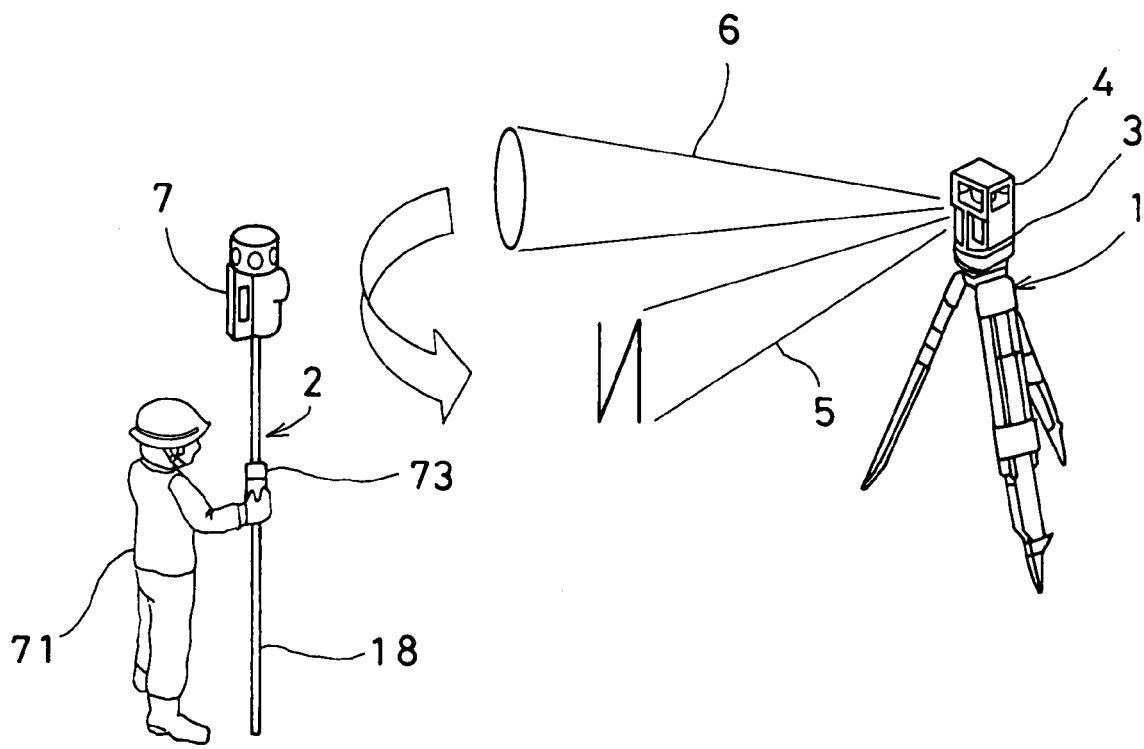
FIG. 2 is a schematical drawing to explain general outline of an arrangement of components and devices in the embodiment of the present invention.

In a surveying device 1 shown in FIG. 1, a horizontal reference plane can be formed and a distance to an object to be measured 2 can be determined.

The surveying device 1 comprises a reference plane forming unit 3 and a distance measuring unit 4. The surveying device 1 is installed at a known point. A laser beam 5 for forming a reference plane is projected at a constant velocity by rotary irradiation, and a distance measuring light 6 can be projected by rotary irradiation. By receiving the distance measuring light 6 reflected from the object to be measured 2, distances to two or more objects to be measured 2 can be determined.

The reference plane forming unit 3 projects a laser beam 5 for forming the reference plane, which comprises two or more fan-shaped laser beams including at least one titled fan-shaped laser beam, at a constant velocity by rotary irradiation, and a horizontal reference plane is formed. (In the figure, the laser beam 5 comprises three fan-shaped laser beams, and a cross-section of a luminous flux of the laser beam 5 has N-shaped form.) As the laser device to project three or more fan-shaped laser beams including one titled laser beam by rotary irradiation, a rotary laser projecting system is proposed in JP-A-2004-212058.

The laser beams 5 for forming reference plane is projected by rotary irradiation. The object to be measured 2 comprises a photodetection device 7. Time difference is found between the moments when two or more fan-shaped laser beams are received by the photodetection device 7. Based on the time difference and a tilt angle of the tilted fan-shaped laser beam, an elevation angle with respect to the horizontal reference plane around the surveying device 1 can be determined. Also, based on the elevation angle, a tilted reference plane can be set.

A surveying device for projecting a fan-shaped laser beam 5 in form of N by rotary irradiation and for projecting a distance measuring light 6 by rotary irradiation is disclosed in JP-A-2006-337302. When the distance measuring light 6 is projected by rotary irradiation, distances to two or more objects 2 to be measured can be determined at the same time. Therefore, positions of each of the objects to be measured 2 in height direction can be determined according to the measured elevation angle and according to the measured distance.

Figure 3:
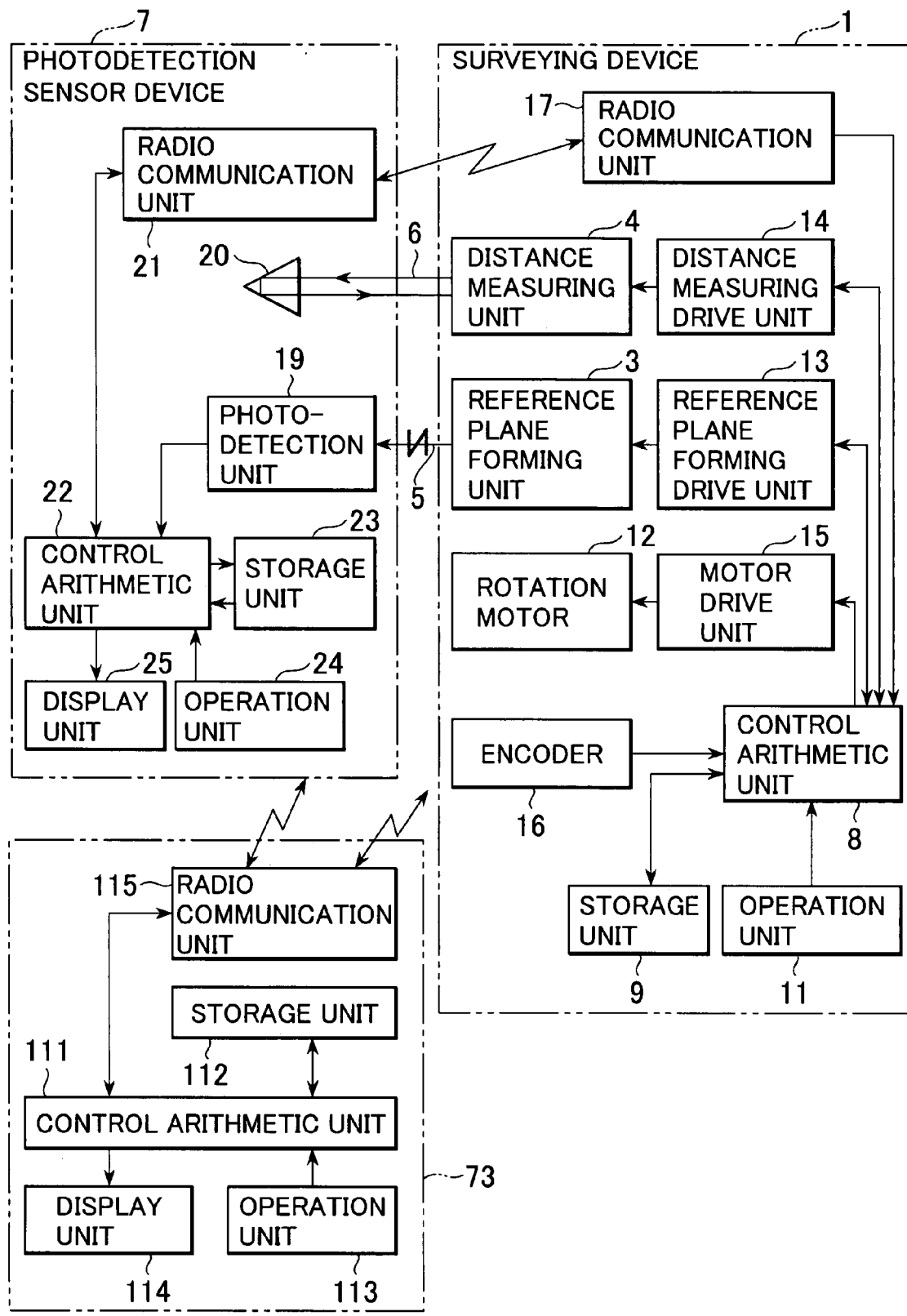
FIG. 3 is a block diagram to show general outline of an arrangement of components and devices in the embodiment of the invention.

FIG. 3 is a block diagram to show approximate arrangement of the measuring system of the present invention. The surveying device 1 primarily comprises the reference plane forming unit 3, the distance measuring unit 4, a control arithmetic unit 8, a storage unit 9, an operation unit 11, a first rotating motor 12 for projecting by rotary irradiation the laser beam 5 for forming reference plane, a second rotating motor 52 (to be described later) for projecting the distance measuring light 6 by rotary irradiation, a reference plane forming drive unit 13 for driving the reference plane forming unit 3, a motor drive unit 15 for driving the first rotating motor 12 and the second rotating motor 52, a distance measuring drive unit 14 for driving the distance measuring unit 4, a radio communication unit 17 for performing communication with the photodetection device 7, and a first encoder 16 for detecting a projecting direction of the distance measuring light 6. The driving of the reference plane forming drive unit 13, the distance measuring drive unit 14 and the motor drive unit 15 are controlled by the control arithmetic unit 8.

The photodetection device 7 is installed at a known point on a pole 18. The photodetection device 7 primarily comprises a photodetection unit 19 for receiving the laser beam 5 for forming reference plane, a reflective member such as a prism 20 or the like for reflecting the distance measuring light 6, a photodetection side radio communication unit 21 for performing radio communication with a radio communication unit 17 of the surveying device 1, a photodetection side control arithmetic unit 22, a photodetection side storage unit 23, a photodetection side operation unit 24, and a photodetection side display unit 25. The photodetection side display unit 25 may be designed as a touch panel so that the photodetection side display unit 25 can also fulfill the function of the photodetection side operation unit 24.

The photodetection side radio communication unit 21 can also perform communication with the photodetection side radio communication unit 21 of another object to be measured 2.

Various types of programs are stored in the photodetection side storage unit 23. These programs include: a computation program for calculating an elevation angle according to the difference of photodetection time as described later, a computation program for calculating a height position based on the elevation angle and distance measurement data, a communication program for performing radio communication with the surveying device 1, other photodetection device 7 and a radio communication unit 115 (to be described later) via the photodetection side radio communication unit 21, and an image display program for displaying details of instruction, details of operation, details of communication, etc. on the photodetection side display unit 25. Also, measurement data transmitted from the surveying device 1 and measurement data obtained at the photodetection device 7 are stored and kept in memory.

Next, description will be given on the surveying device 1 to be used in the measuring system of the present invention.

Figure 4:
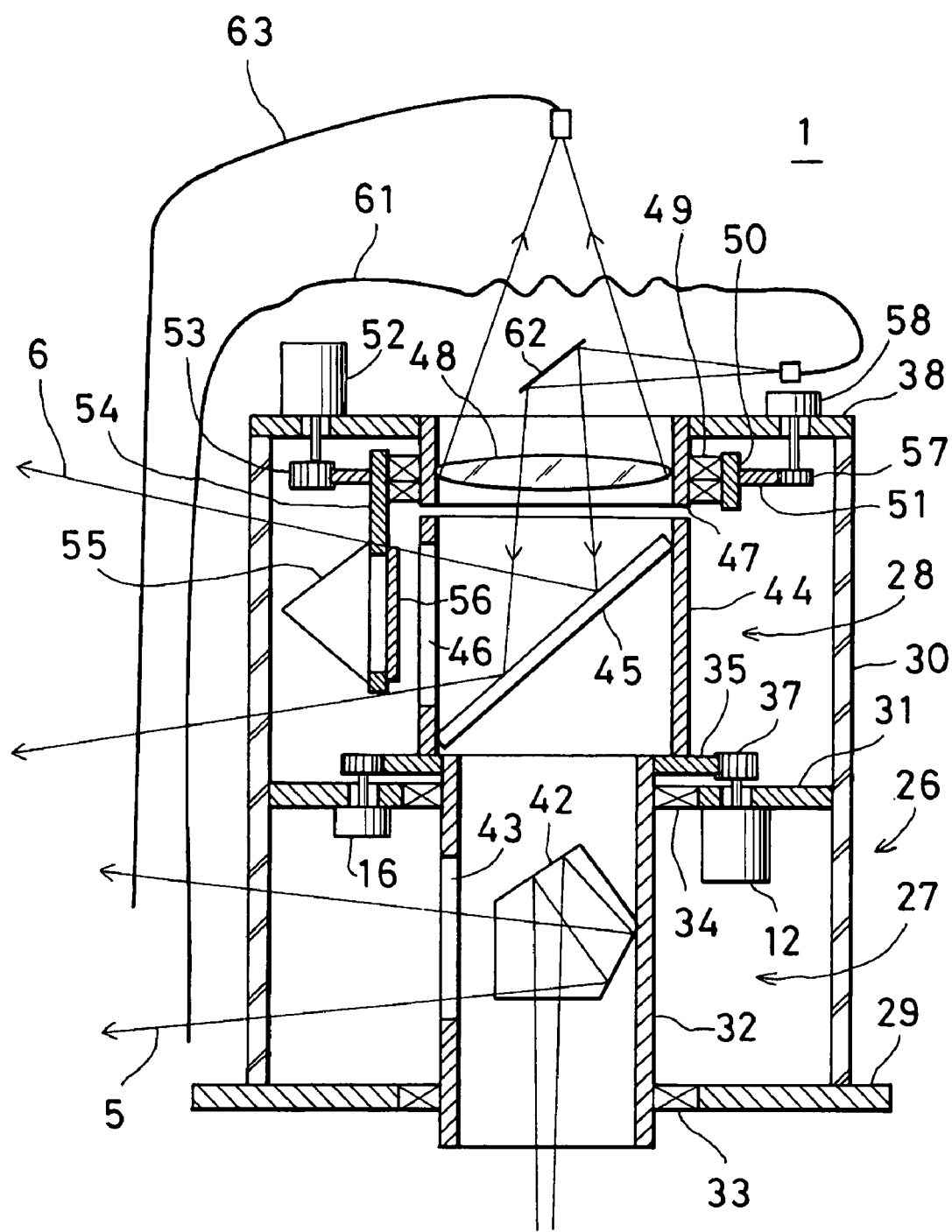
FIG. 4 is a cross-sectional view of a laser beam projecting unit in the embodiment of the invention.

FIG. 4 shows a laser beam projecting unit 26 of the surveying device 1 according to the present invention. The laser beam projecting unit 26 comprises a reference plane forming light projecting unit 27 for forming the reference plane and a distance measuring light projecting unit 28. The reference plane forming light projecting unit 27 can project the reference plane forming laser beam 5, and the distance measuring light projecting unit 28 can project the distance measuring light 6 both independently from each other. In the present embodiment, the projecting direction of the reference plane forming laser beam 5 is the same as the projecting direction of the distance measuring light 6, while these may not necessarily be the same as each other. For instance, the projecting directions of these two light projecting units may be deviated by 180° from each other.

In FIG. 4, reference numeral 29 denotes a ceiling unit 29 of a housing of the surveying device 1. Inside the housing, a laser light source (not shown) for forming reference plane is accommodated. On an upper side of the ceiling unit 29, a light projection window 30 in cylindrical shape is disposed. The light projection window 30 is made of a material such as transparent glass or the like and the light projection window 30 is arranged coaxially with an optical axis of the reference plane forming light projecting unit 27. On an upper end of the light projection window 30, an upper base plate 38 is mounted, and an intermediate base plate 31 is disposed inside the light projection window 30.

A prism holder 32 in cylindrical shape is arranged coaxially with the optical axis of the reference plane forming light projecting unit 27. The prism holder 32 is rotatably supported by the ceiling unit 29 and the intermediate base plate 31 via bearings 33 and 34.

Inside the prism holder 32, there is provided a pentagonal prism 42 as a deflecting optical member. A first light projecting hole 43 to face to the pentagonal prism 42 is formed on the prism holder 32. After being projected from the laser light source for forming reference plane, the reference plane forming laser beam 5 is deflected in a horizontal direction by the pentagonal prism 42, and the reference plane forming laser beam 5 is projected in a horizontal direction via the first light projection hole 43.

On an upper end of the prism holder 32, a first rotary gear 35 is disposed. The first rotating motor 12 is mounted on the intermediate base plate 31, and a first driving gear 37 attached on an output shaft of the first rotating motor 12 is engaged with the first rotary gear 35. By driving the first rotating motor 12, the first driving gear 37 is rotated. Via the first rotary gear 35 and the prism holder 32, the pentagonal prism 42 is rotated, and the reference plane forming laser beam 5 is rotated within a horizontal plane.

The first encoder 16 is mounted on the intermediate base plate 31. The first encoder 16 detects a rotation angle of the first rotary gear 35. According to the rotation angle thus detected, projecting directions of the reference plane forming laser beam 5 and the distance measuring light 6 to be described later are detected.

A mirror holder 44 coaxial with the prism holder 32 is provided on the prism holder 32. A reflection mirror 45 as a deflecting optical member is held by the mirror holder 44, and a second light projecting hole 46 is formed on a portion facing to a reflection surface of the reflection mirror 45. The mirror holder 44 and the prism holder 32 are integrated with each other. The pentagonal prism 42 and the reflection mirror 45 have the same optical axis and are integrally rotated. When these two are rotated with the same optical axis, the pentagonal prism 42 and the reflection mirror 45 may not necessarily be integrated with each other.

A body tube 47 is disposed on the upper base plate 38. The center of the body tube 47 concurs with the center of the mirror holder 44, and a condenser lens 48 is held by the body tube 47. A rotary ring 50 is rotatably disposed on the body tube 47 via bearings 49, and a second rotary gear 51 is engaged with the rotary ring 50.

On the upper base plate 38, the second rotating motor 52 is arranged. A second driving gear 53 is attached on an output shaft of the second rotating motor 52, and the second driving gear 53 is engaged with the second rotary gear 51.

A reflection prism holding member 54 is fixedly mounted on the rotary ring 50, and a reference reflection prism 55 for internal light optical path as a reference reflection unit is fixed on the reflection prism holding member 54. On an optical path of the internal light, e.g. on a reflection surface of the reference reflection prism 55, an amplitude filter (optical density filter) 56 is disposed. The amplitude filter 56 is so designed that density is continuously varied in a horizontal direction (rotating direction), and transmission light amount of the laser beam is continuously decreased or continuously increased. In the amplitude filter 56, the density may be varied stepwise, and it would be suffice if the density is varied gradually in a rotary scanning direction.

More concretely, the reference reflection prism 55 is designed as a corner cube, and an optical filter is attached on the corner cube. The optical filter has a transmissivity which is higher near the center and is decreased toward the periphery.

A second encoder 58 is mounted on the upper base plate 38. A second driven gear 57 is attached on an input shaft of the second encoder 58, and the second driven gear 57 is engaged with the second rotary gear 51.

When the second rotating motor 52 is driven, the reference reflection prism 55 is integrally rotated with the amplitude filter 56 via the second driving gear 53, the second rotary gear 51, and the rotary ring 50. Rotation angle of the rotary ring 50 is detected by the second encoder 58 via the second rotary gear 51 and the second driven gear 57.

A deflection mirror 62 is disposed on an optical axis of the condenser lens 48, and an exit end of an exit light optical fiber 61 is positioned in such manner that the exit end faces to a reflection surface of the deflection mirror 62. At a light converging position on the optical axis of the condenser lens 48, an incident end of a photodetection (light receiving) optical fiber 63 is disposed.

The exit light optical fiber 61 guides the distance measuring light 6 emitted from a light emitting element 59 (to be described later) toward the deflection mirror 62, and the photodetection optical fiber 63 guides a reflected distance measuring light 6' and an internal reference light 6" toward a photodetection element 65 (to be described later).

Now, referring to FIG. 5 to FIG. 9, description will be given on the measurement of an elevation angle of the photodetection device 7 with respect to the surveying device 1, i.e. the laser beam projecting unit 26.

Figure 5:
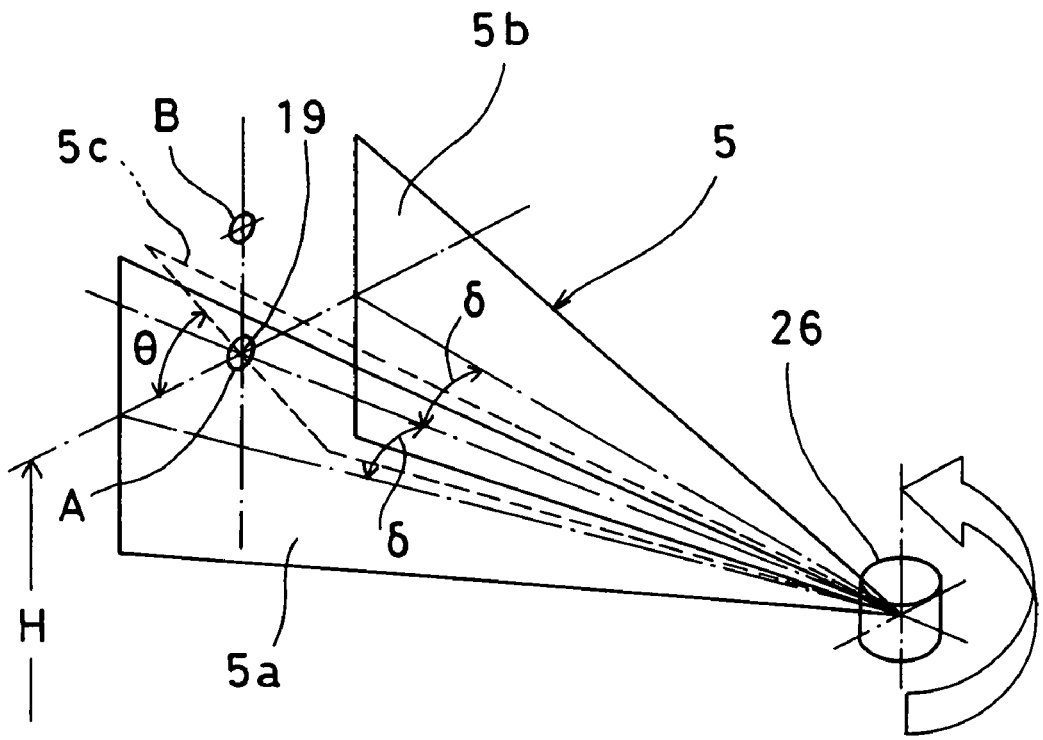
FIG. 5 is a schematical drawing to explain a case where an elevation angle is calculated in the embodiment of the invention.

Referring to FIG. 5, description will be given below on an elevation angle γ and an elevation (high-low) difference H with respect to a horizontal line at the position of the photo-detection device 7. FIG. 5 shows the relation between the photodetection unit 19 and the reference plane forming laser beam 5. The height of the laser beam projecting unit 26 is measured in advance and is already known.

The reference plane forming laser beam 5 is projected by rotary irradiation and the reference plane forming laser beam 5 runs across the photodetection unit 19. In this case, the reference plane forming laser beam 5 is composed of fan-shaped beams 5a, 5b and 5c, and the laser beam can be received even when the photodetection unit 19 is a spot-like photodetection element, and it is not necessary to perform accurate position alignment of the photodetection device 7.

When the reference plane forming laser beam 5 runs across the photodetection unit 19, each of the fan-shaped beams 5a, 5b, and 5c runs across the photodetection unit 19. From the photodetection unit 19, three photodetection signals 40a, 40b and 40c, corresponding to the fan-shaped beams 5a, 5b and 5c respectively, are issued.

Figure 9A:
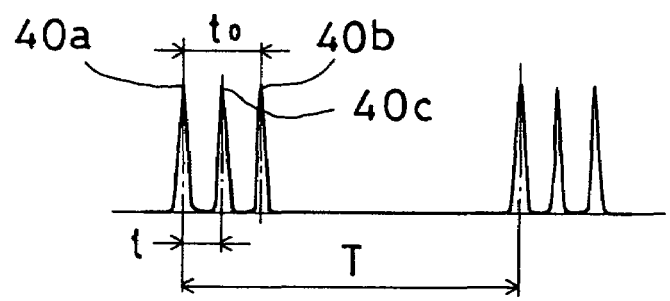
FIG. 9 (A) and FIG. 9 (B) each represents a diagram to explain a case where an elevation angle is calculated in the embodiment of the invention.
Figure 9B:
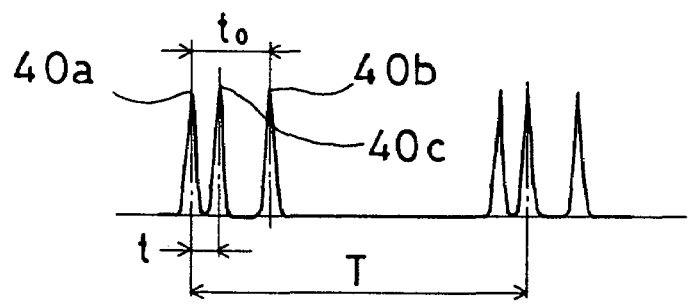

In case the photodetection unit 19 is located at Point A as shown in FIG. 5 to FIG. 8 with respect to the reference plane forming laser beam 5, i.e. in case the photodetection unit 19 is at the center of the reference plane forming laser beam 5, photodetection signals are given as shown in FIG. 9 (A), and time intervals between the photodetection signals 40a, 40b and 40c are equal to each other. In the figure, reference symbol T represents a time cycle, during which the reference plane forming laser beam 5 is rotated by one turn.

Figure 6:
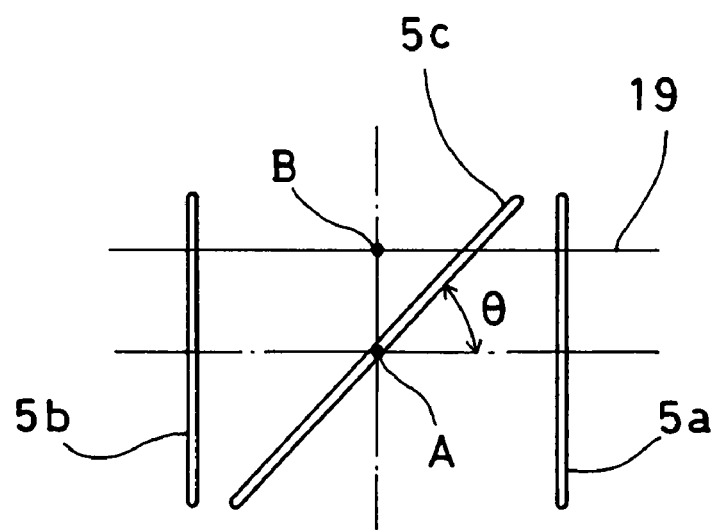
FIG. 6 is a schematical drawing to explain a case where an elevation angle is calculated in the embodiment of the invention.
Figure 7:
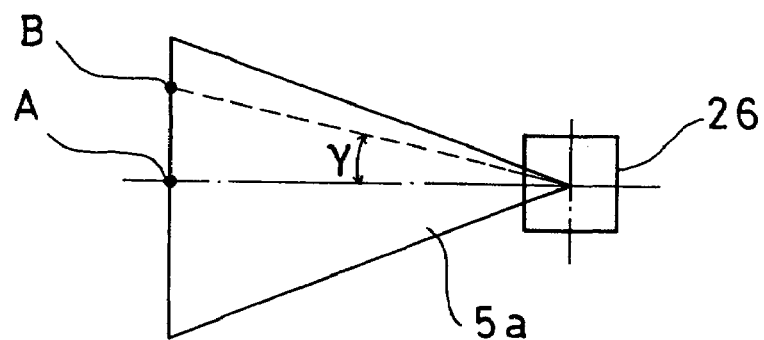
FIG. 7 is a schematical drawing to explain a case where an elevation angle is calculated in the embodiment of the invention.
Figure 8:
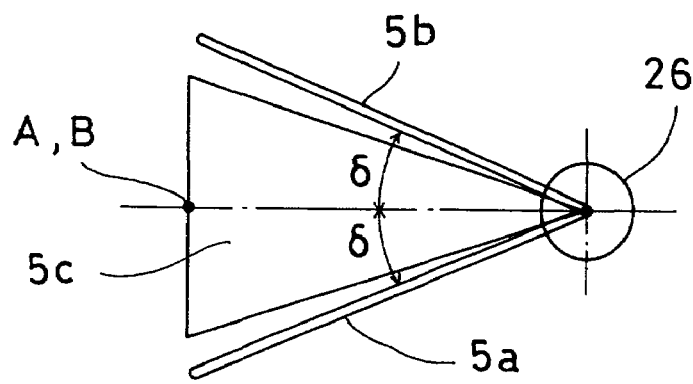
FIG. 8 is a schematical drawing to explain a case where an elevation angle is calculated in the embodiment of the invention.

When the photodetection unit 19 is deviated from the center of the reference plane forming laser beam 5 and is located at Point B as shown in FIG. 5 to FIG. 8, time intervals between the photodetection signals 40a, 40b and 40c vary from each other (See FIG. 9 (B)). In FIG. 6, when the photodetection unit 19 relatively moves from the right toward the left in the figure, the interval between the photodetection signal 40a and the photodetection signal 40c is turned to shorter, and the interval between the photodetection signal 40c and the photodetection signal 40b is turned to longer.

The cross-sections of the luminous flux of the reference plane forming laser beam 5 as shown in FIG. 6 have cross-sectional configurations similar to each other regardless of the distance between the photodetection device 7 and the laser beam projecting unit 26. By obtaining the ratio of time differences, it is possible to calculate the running position of the photodetection unit 19 in the configuration, which is turned to dimensionless. The elevation angle γ to the position of Point B with the surveying device 1 as the center can be readily calculated. According to the elevation angle γ and according to the distance L between the laser beam projecting unit 26 and the photodetection device 7, elevation difference H with respect to the horizontal line at the position of the photodetection device 7 can be determined.

As described above, the configuration made up by a plurality of fan-shaped beams may not necessarily be N-shaped configuration. It would be satisfactory if at least one of the fan-shaped beams is tilted and other configuration data such as the tilt angle are already known.

Figure 10:
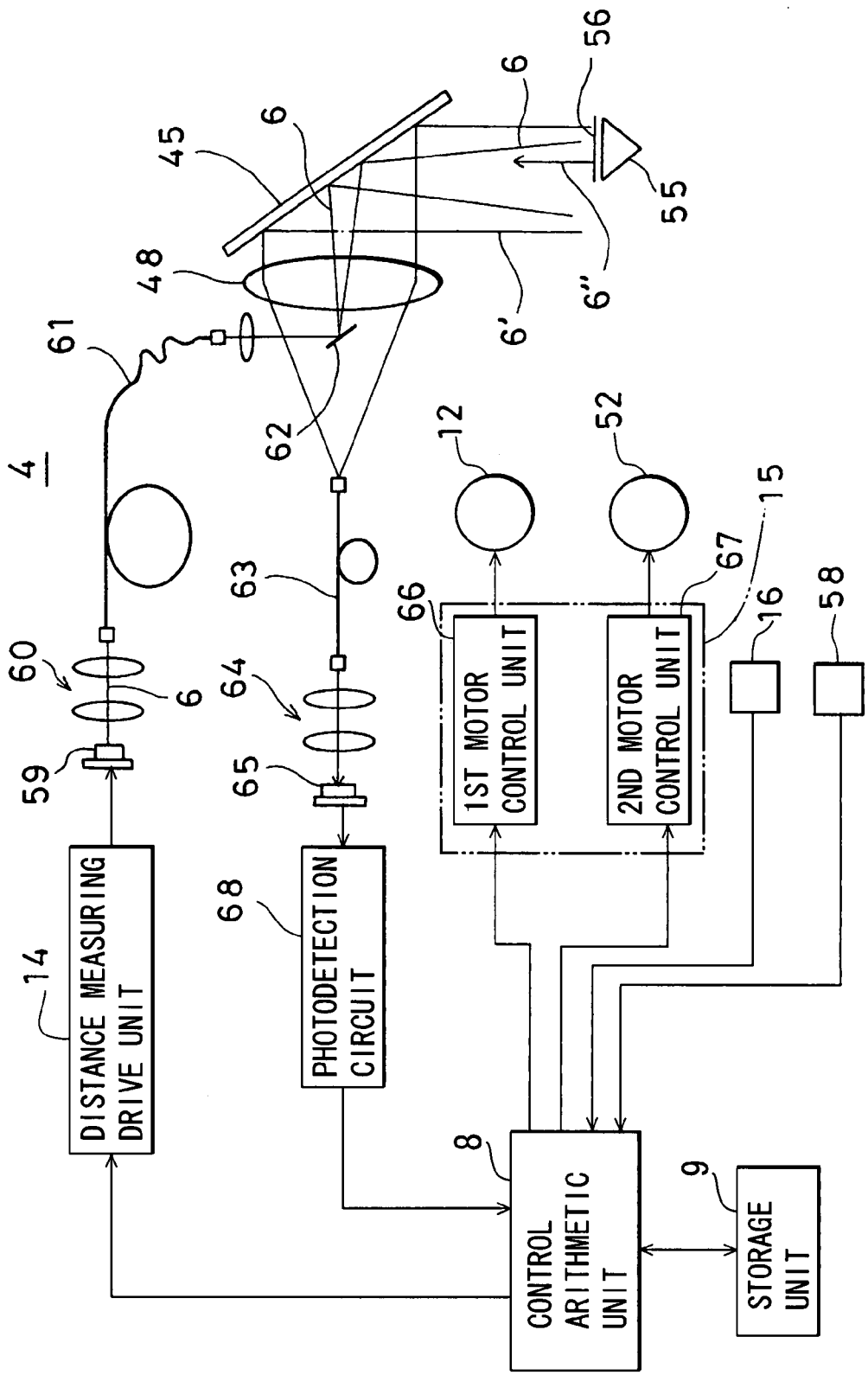
FIG. 10 a drawing to show approximate arrangement of a distance measuring unit in the embodiment of the invention.
Figure 11:
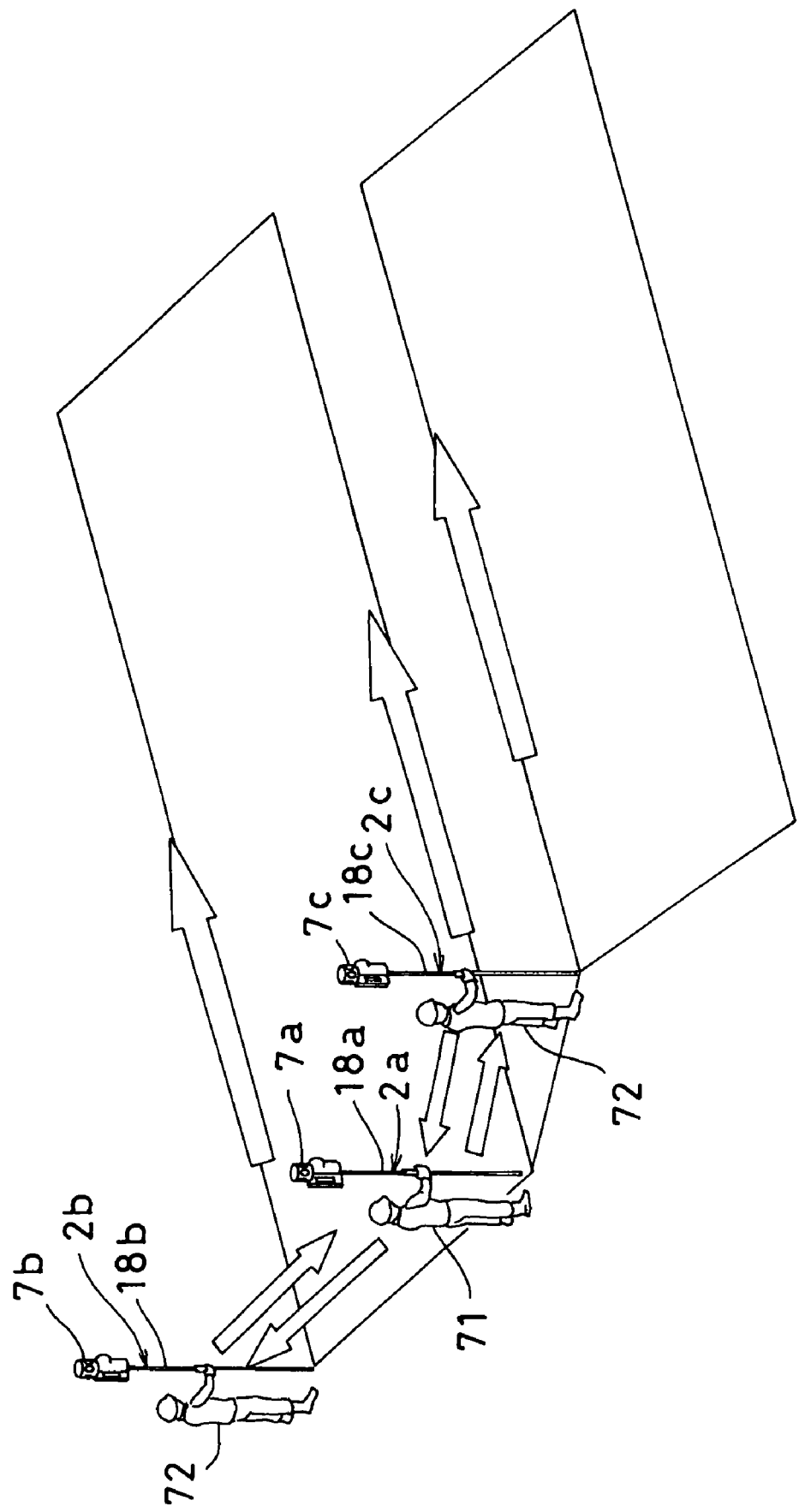
FIG. 11 is a schematical drawing to show surveying operation in the embodiment of the invention.

Referring to FIG. 10, description will be given on the distance measuring unit 4.

A condenser lens 60 is disposed on an exit light optical axis of the light emitting element 59, and an incident end of the exit light optical fiber 61 is arranged at the convergent position of the condenser lens 60. As described above, the exit light optical fiber 61 guides the distance measuring light 6 toward the deflection mirror 62.

The incident end of the photodetection optical fiber 63 is arranged at the convergent position of the condenser lens 48, and the exit end of the photodetection optical fiber 63 is arranged on an optical axis of a condenser lens 64. The reflected distance measuring light 6' and the internal reference light 6" emitted from the photodetection optical fiber 63 are converged to the photodetection element 65 by the condenser lens 64.

The distance measuring drive unit 14 controls the driving and the light emission of the light emitting element 59 according to a control signal from the control arithmetic unit 8. A photodetection circuit 68 performs the necessary processing such as amplifying, A/D conversion, and so on of the photodetection signal from the photodetection element 65, and the signal thus processed is sent to the control arithmetic unit 8.

The control arithmetic unit 8 comprises the storage unit 9. In the storage unit 9, there are stored various types of programs, etc. including: a distance measuring computation program for performing calculation involved in distance measurement, a sequence program for executing the measurement, and a communication program for carrying out radio communication with the photodetection device 7. Also, there are stored data such as geographical data including the measurement range, and data relating to measurement schedule such as setting of the measuring points, etc. Further, the storage unit 9 stores the changes over time of the light amount of photodetection signals from the photodetection element 65, the data during the course of measurement, and so on.

The control arithmetic unit 8 issues control signals to a first motor drive unit 66 for the first rotating motor 12 and to a second motor drive unit 67 for the second rotating motor 52 according to the sequence program. The first motor control unit 66 controls rotation and stopping of the first rotating motor 12, and the second motor control unit 67 controls rotation and stopping of the second rotating motor 52.

The first encoder 16 detects a rotation angle of the mirror holder 44 and transmits the rotation angle to the control arithmetic unit 8. The second encoder 58 detects a rotation angle of the reference reflection prism 55 and inputs the rotation angle to the control arithmetic unit 8.

Description will be given below on operation of the measurement.

The light emitting element 59 emits a light through intensity modulation at a certain frequency by the distance measuring drive unit 14 and emits a laser beam for distance measurement. The laser beam from the light emitting element 59 is converged by the condenser lens 60 to the incident end of the exit light optical fiber 61. Guided by the exit light optical fiber 61, the laser beam is emitted as the distance measuring light 6 from the exit end. The distance measuring light 6 is reflected by the deflection mirror 62 along the optical axis of the condenser lens 48. Further, being converged by the condenser lens 48, the distance measuring light 6 enters the reflection mirror 45. Then, it is deflected by the reflection mirror 45 and is projected from the second light projection hole 46 in a horizontal direction as a fan-shaped laser beam with a spreading angle as required.

Under the condition that the distance measuring light 6 is projected and the reference plane forming laser beam 5 is projected, the first rotating motor 12 is driven. The pentagonal prism 42 and the reflection mirror 45 are rotated via the first driving gear 37 and the first rotary gear 35. The reference plane forming laser beam 5 and the distance measuring light 6 are projected from the light projection window 30 by rotary irradiation or the reference plane forming laser beam 5 and the distance measuring light 6 are projected in such manner that at least a measurement area where the object to be measured 2 is present is scanned reciprocally.

Under the condition where the distance measurement is performed, i.e. under the condition that the distance measuring light 6 is projected, the reference reflection prism 55 is rotated by the second rotating motor 52, and the reference reflection prism 55 is in the condition where the reference reflection prism 55 is deviated from the direction of the object to be measured 2, i.e. deviated from the measuring direction. The rotating motor 52 is stopped, and the reference reflection prism 55 is hold at a predetermined position where no substantial influence is exerted on the measurement.

In the case there are two or more objects to be measured 2 and in the case trouble may occur in the measurement if the reference reflection prism 55 is held at a certain position, it may be designed in such manner that the reference reflection prism 55 is rotated in response to the rotation of the reflection mirror 45 so that the overlapping of the measuring direction with the position of the reference reflection prism 55 can be avoided. Specifically, the direction where the objects to be measured 2 is present can be detected by the first encoder 16. Thus, rotary scanning is performed in advance to determine the position of the object to be measured 2. Then, based on the result of detection by the second encoder 58, the reference reflection prism 55 can be moved to a position deviated from the measuring direction.

The distance measuring light 6 is projected by rotary irradiation at a predetermined velocity and runs across the object to be measured 2. Then, the distance measuring light 6 is reflected by the object to be measured 2. The reflected distance measuring light 6' reflected by the object to be measured 2 enters the reflection mirror 45 and is reflected by the reflection mirror 45. Further, the reflected distance measuring light 6' is converged by the condenser lens 48 and enters the photodetection optical fiber 63 through the incident end. The reflected distance measuring light 6' projected from the photodetection optical fiber 63 is converged by the condenser lens 64 and is received by the photodetection element 65. A photodetection signal from the photodetection element 65 is sent to the control arithmetic unit 8 after being processed by the processing such as amplifying, A/D conversion, etc. and is stored in the storage unit 9 via the control arithmetic unit 8.

When the distance measuring light 6 is projected by rotary irradiation, the distance measuring light 6 runs across also the reference reflection prism 55 and is reflected by the reference reflection prism 55 in the process of running across it. The reflected laser beam is further reflected by the reflection mirror 45 and is received by the photodetection element 65 as an internal reference light 6" via the condenser lens 48 and the photodetection optical fiber 63.

In this case, the optical path, which reaches the photodetection element 65 via the exit light optical fiber 61, the reflection mirror 45, the reference reflection prism 55, the reflection mirror 45, and the photodetection optical fiber 63, is an internal reference light optical path. The length of this internal reference light optical path is a value already known from the design value or from actual measurement.

The amplitude filter 56 is provided on the reflection surface of the reference reflection prism 55. When the distance measuring light 6 runs across the amplitude filter 56, the distance measuring lights 6 with different light amounts are reflected by the reference reflection prism 55. The photodetection element 65 receives the internal reference lights 6" with different light intensities and issues photodetection signals with different light intensities. The range of light intensity, which is varied by the amplitude filter 56, should be set so that it will be set to the maximum in the dynamic range of the photodetection unit or it will be within the dynamic range.

The photodetection signal from the photodetection element 65 is inputted to the photodetection circuit 68. The photodetection circuit 68 performs the processing as necessary such as amplifying, A/D conversion, etc. on the photodetection signals of the reflected distance measuring light 6' and the internal reference light 6". The signals thus processed are sent to the control arithmetic unit 8 and are stored in the storage unit 9 via the control arithmetic unit 8. According to the distance measuring program stored in the storage unit 9, the control arithmetic unit 8 calculates phase difference between the reflected distance measuring light 6' and the internal reference light 6" based on the photodetection signals stored in the storage unit 9, and calculates a distance to the object to be measured according to the calculated phase difference and according to light velocity.

Photodetection intensity of the reflected distance measuring light 6' varies according to the distance to the object to be measured 2. Specifically, when the object to be measured 2 is located at near distance, the reflected distance measuring light 6' has high light intensity. When the object to be measured 2 is at remote position, light intensity of the reflected distance measuring light 6' is low. Therefore, in order to accurately calculate the phase difference through comparison of the internal reference light 6" with the reflected distance measuring light 6', it is necessary to arrange so that the photodetection intensities of the internal reference light 6" and the reflected distance measuring light 6' at the photodetection element 65 are to be equal to each other.

The changes over time of the light amount of the photodetection signals from the photodetection element 65 are stored in the storage unit 9. Among the stored photodetection signals, a photodetection signal, which has a light intensity equal or similar to the light intensity of the reflected distance measuring light 6', is extracted, and the photodetection signal thus extracted is regarded as the internal reference light 6" for the measurement.

As a result, an internal reference light with adequate light intensity is obtained without changing the optical path.

The measured distance data is transmitted to the photodetection side radio communication unit 21 from the radio communication unit 17, and the measured distance data received by the photodetection side radio communication unit 21 is stored in the photodetection side storage unit 23.

The reference plane forming laser beam 5 is also projected by rotary irradiation, and the reference plane forming laser beam 5 runs across the object to be measured 2. The three fan-shaped laser beams to constitute the reference plane forming laser beam 5 run across the photodetection unit 19. The photodetection unit 19 receives the three fan-shaped laser beams individually and issues a photodetection signal for each of the fan-shaped laser beams. The photodetection time interval (photodetection time difference) of the photodetection signals are calculated at the photodetection side control arithmetic unit 22. An elevation angle of the photodetection unit 19 with respect to the surveying device 1 is calculated based on the photodetection time difference, and the height position of the photodetection unit 19 is determined based on the elevation angle and on the result of the measurement of the distance between the surveying device 1 and the object to be measured 2 (see FIG. 3).

Thus, three-dimensional position data at the measuring point can be obtained.

Next, referring to FIG. 11 to FIG. 16, description will be given on a measuring system, which comprises the surveying device 1 and a plurality of objects to be measured 2a, 2b and 2c and is used for measuring distances to a plurality of points at the same time.

In this measuring system, an arithmetic device such as a small-size personal computer is further provided as a main arithmetic device for totally coordinating the surveying operation. As the small-size personal computer, a portable PDA (Personal Digital Assistant) 73 (see FIG. 2) is used, for instance. The PDA 73 may be installed on a pole 18a or the PDA 73 may be carried by a surveyor 71. Further, the functions of the main arithmetic device may be executed by one of photodetection devices 7a, 7b and 7c of the objects to be measured 2a, 2b and 2c.

Now, description will be given on the PDA 73.

The PDA 73 primarily comprises a control arithmetic unit 111, a storage unit 112, an operation unit 113, a display unit 114, and a radio communication unit 115. The radio communication unit 115 can perform radio communication with the surveying device 1 via the radio communication unit 17 and with the photodetection device 7 via the photodetection side radio communication unit 21. In the storage unit 112, there are stored various types of programs including: a communication program, an image display program for displaying contents (details) of operation, contents of communication, etc. on the display unit 114, a guidance program for providing guidance, etc. to execute various surveying operations such as as-built surveying (finished work surveying), cross-sectional (lateral profile) surveying, survey setting, actual status surveying, etc., an automatic guiding program, a mode selection program for selecting measurement mode such as as-built surveying, cross-sectional surveying, survey setting, actual status surveying, etc., a menu program for providing guidance display in the case the data is inputted from the display unit 114 for each measurement mode, etc. Also, map of the region where surveying is performed, design data for executing engineering work, etc. are stored, and measurement data transmitted from the surveying device 1 and measurement data obtained at the photodetection device 7 are stored and kept in memory (see FIG. 3).

The display unit 114 may be provided independently and separately or the display unit 114 may be designed as a touch panel so that the display unit 114 may also fulfill the functions as the operation unit.

Among the objects to be measured 2, one object to be measured 2a is held by one surveying operator 71, and the objects to be measured 2b and 2c are held by assistant surveying operators 72 and 72 respectively. The object to be measured 2a is further provided with an arithmetic device such as a small-size PC, e.g. PDA 73.

The PDA 73, the objects to be measured 2a, 2b and 2c, and the surveying device 1 can perform radio communication with each other or individually. As a form of the radio communication, wireless LAN using the PDA 73 as the server may be built.

The data may be given and taken between the photodetection devices 7 and 7 or may be given and taken between the photodetection devices 7 and 7 via the position measuring system main unit 1.

In the description given below, the display unit 114 is designed as a touch panel, and the display unit 114 executes the functions of the photodetection side operation unit 24.

A screen depending on the contents of operation is displayed on the display unit 114 or the screen can be switched over depending on the contents of operation.

Figure 12:
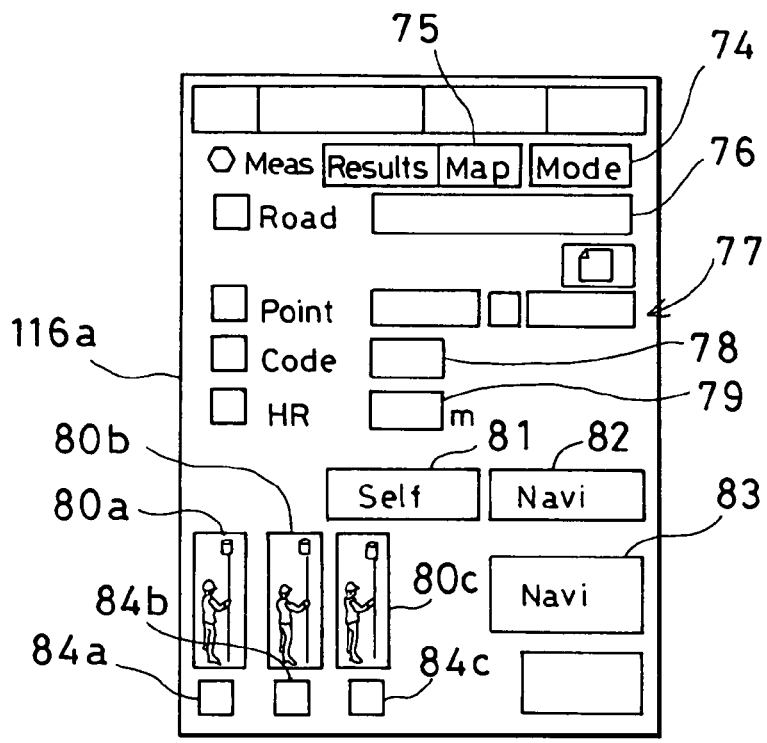
FIG. 12 is a drawing to show a main screen of a display unit in a main control device in the embodiment of the invention.

FIG. 12 shows a main screen 116a. The main screen 116a comprises a mode selection button 74 for selecting the measurement mode such as as-built surveying, cross-sectional (lateral profile) surveying, setting, actual status surveying, etc., a map setting button 75 for calling and setting of an operation map, a display window 76 for displaying measurement status, a coordinate position display unit 77 for indicating coordinate position of the measuring point, a measuring point name display unit 78 for displaying ID number to specify the coordinate position, a height display unit 79 for indicating height position of the measuring point, a self-mode selection button 81 for selecting operation mode when surveying is carried out, a navigation mode selection button 82, an auto-navigation selection button 83, a measuring operator and assistant measuring operator displaying units 80a, 80b, and 80c, and a measuring operator and assistant measuring operator designating buttons 84a, 84b and 84c. The measuring operator and assistant measuring operator display units 80a, 80b and 80c and the measuring operator and assistant measuring operator designating buttons 84a, 84b and 84c are displayed to correspond to each of the surveying operators 71 and the assistant surveying operators 72. Each of the surveying operators 71 and the assistant surveying operators 72 are associated with the measuring operator and assistant measuring operator displaying units 80a, 80b and 80c, and the measuring operator and assistant measuring operator designating buttons 84a, 84b and 84c each other by setting and inputting identification symbols of the measuring operators and the assistant measuring operators and, further, if necessary, by also setting and inputting the names of the surveying operator 71 and the assistant surveying operators 72.

Figure 13:
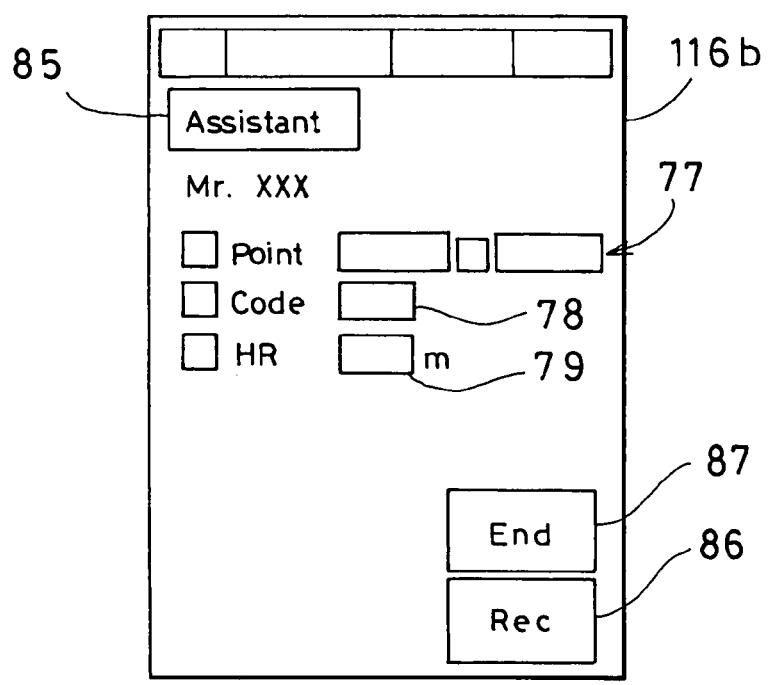
FIG. 13 is a drawing to show a self-mode sub-screen of the display unit of the main control device in the embodiment of the invention.

FIG. 13 shows a self-mode sub-screen 116b. The self-mode sub-screen 116b is displayed when a self-mode is selected by operating the self-mode selection button 81 on the main screen 116a, and one of the measuring operator and assistant measuring operator designating buttons 84a, 84b and 84c is operated.

The self-mode sub-screen 116b is displayed when the surveyor 71 or the assistant surveyor 72, who is holding the object to be measured 2, carries out the measurement by himself. The self-mode sub-screen 116b has an operator display unit 85 for displaying the operator specified by the measuring operator and assistant measuring operator buttons 84a, 84b and 84c is displayed, for instance, indication of "Assistant" or the name or the like of operators is displayed. Also, the self-mode sub-screen 116b has a measuring point name display unit 78 for displaying ID number to specify the measuring position, a coordinate position display unit 77 for displaying measurement result at the measuring point, and a height display unit 79 for displaying height position of the measuring point.

The self-mode sub-screen 116b has a recording button 86 for recording the data obtained from measurement operation to the storage unit 112 and a completion button 87 for completing and terminating the self-mode and for returning to the main screen 116a.

Next, the navigation mode is a mode, in which the surveyor 71 performs measurement by guiding the assistant surveyor 72 to the measuring position. When the navigation selection button 82 is operated, the navigation mode is selected.

Figure 14:
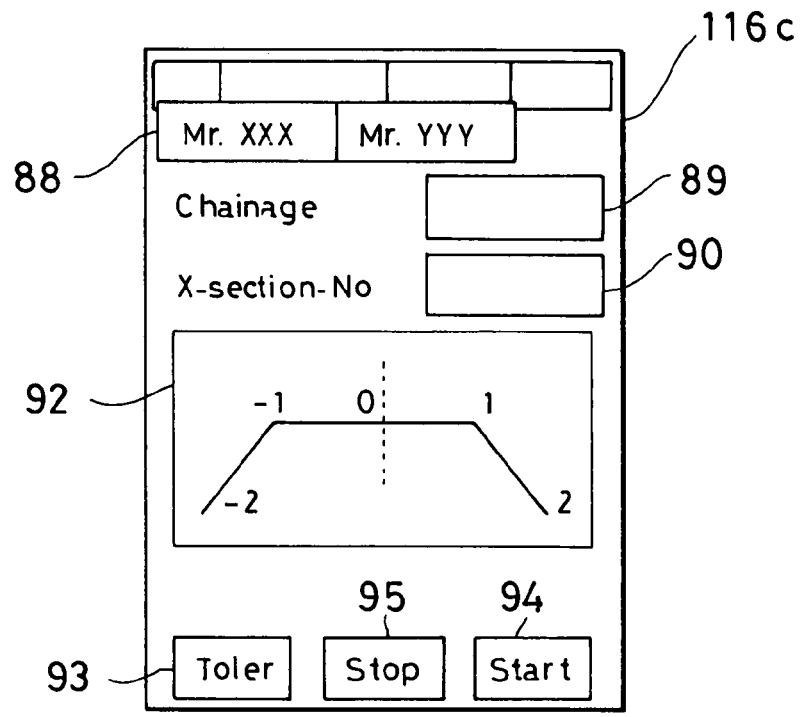
FIG. 14 is a drawing to show a navigation sub-screen of the display unit of the main control device in the embodiment of the invention.

FIG. 14 shows a navigation sub-screen 116c. When the surveyor 71 selects the navigation mode, the screen of the display unit 114 is switched over to the navigation sub-screen 116c. The navigation sub-screen 116c has an assistant surveyor designating screen 88 for displaying the assistant surveyor 72 to be guided, measuring point setting screens 89 and 90, an image display unit 92 for indicating position of the measuring point, an allowable value display unit 93 for displaying an allowable value to a set value when the measuring point is set, a starting button 94 for setting the starting of guidance, and a stop button 95 for setting up the stopping and the restarting of the operation in case the guided position is an error.

Figure 15:
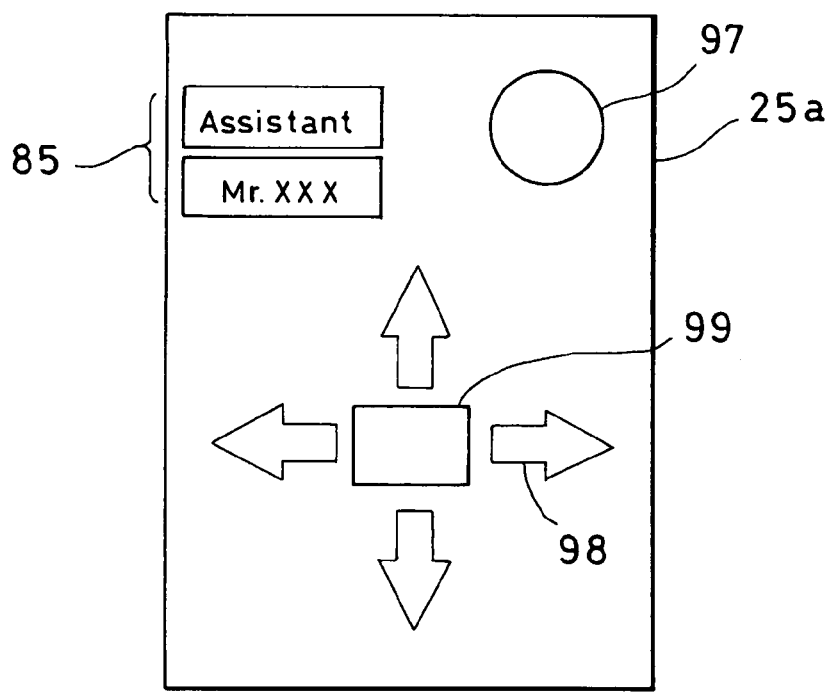
FIG. 15 is a drawing to show an instruction receiving screen of the display unit of a photodetection device in the embodiment of the present invention.
Figure 16:
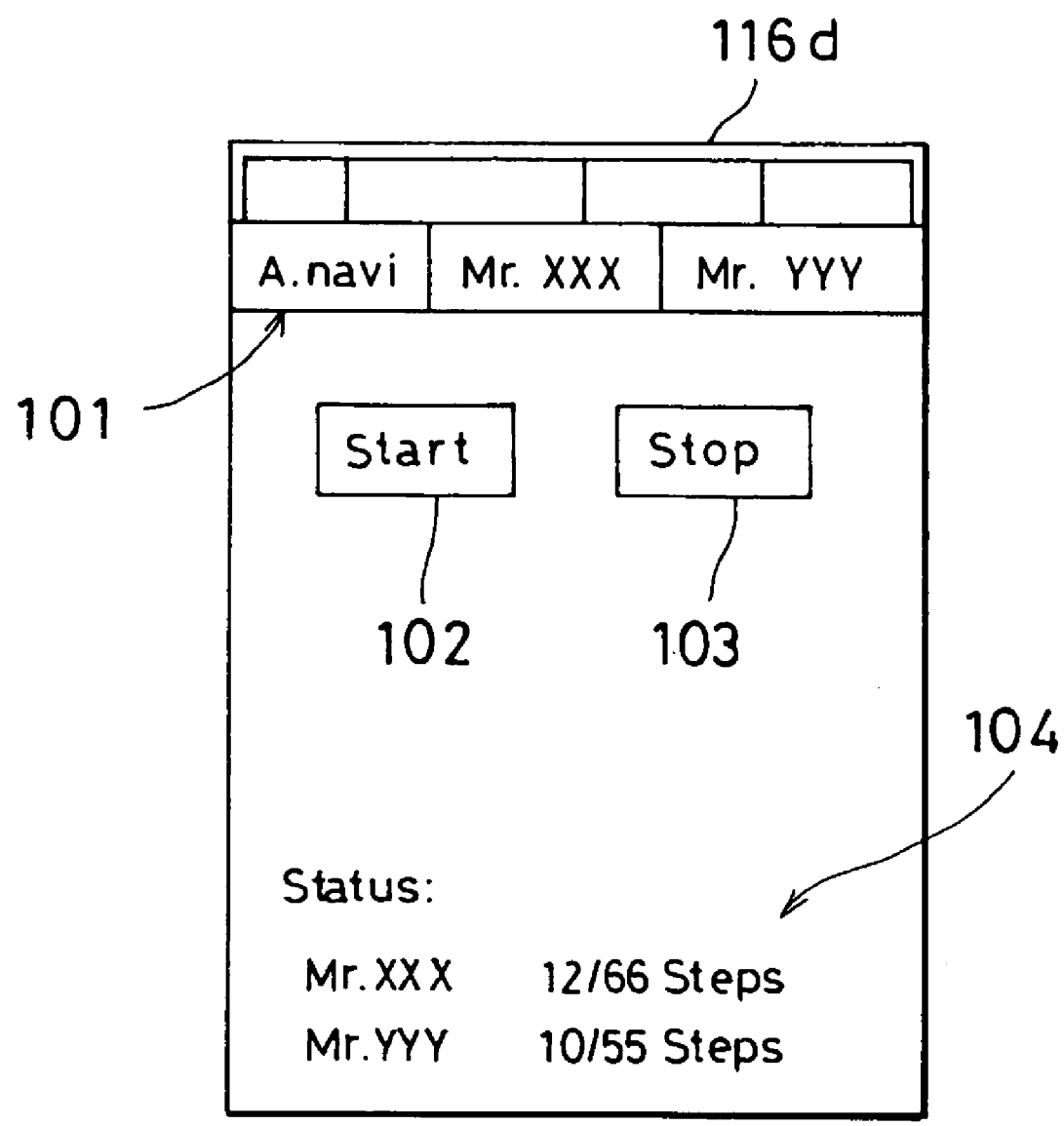
FIG. 16 is a drawing to show an auto-navigation screen of the display unit of the main control device in the embodiment of the present invention.
Figure 17:
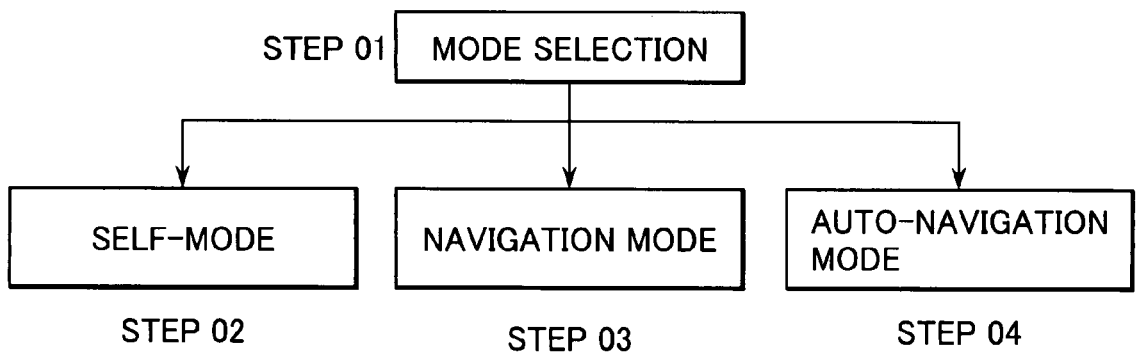
FIG. 17 is a chart to show mode selection in the embodiment of the invention.

When the surveyor 71 selects the navigation mode, the information of the selection of the navigation mode is sent via radio communication to the photodetection side radio communication units 21a, 21b and 21c (not shown) from the radio communication unit 115, and the display unit 25 of each of the objects to be measured 2b and 2c is switched over to an instruction receiving screen 25a (see FIG. 15).

The instruction receiving screen 25a has an operator display unit 85 for specifying the assistant surveyor 72 in operation, an operation lamp 97 for displaying that it is in the course of navigation, a direction display unit 98 for displaying direction of moving (guiding direction) by an arrow or the like, and a termination display unit 99 to be lighted up when the position of the photodetection device 7 concurs with the measuring point. The displaying of the direction of moving is not limited to an arrow, but a numerical value may be displayed or the direction may be displayed by changing the color.

When the auto-navigation button 83 is operated, auto-navigation mode is selected, and an auto-navigation screen 116d (see FIG. 16) is displayed on the photodetection side display unit 25 of the surveyor 71. The auto-navigation screen 116d has an operator display unit 101 for displaying identifications of a measuring operator and an assistant measuring operator, a starting button 102 for starting the navigation, a stop button 103 for stopping the navigation, and an operation progress display unit 104 for displaying the course of progress of operation by the assistant surveyor 72. When the auto-navigation mode is selected, the instruction receiving screen 25a (see FIG. 15) is displayed on the photodetection side display unit 25 of the assistant surveyor 72.

When the auto-navigation mode is selected, the automatic guidance program is started and developed, and the operation data is called from the storage unit 112. According to the operation data, the designation of the measuring points are sequentially sent to the assistant surveyor 72. Then, the measuring points are determined according to the surveying program, and the moving of the assistant surveyor 72 to the measuring points and the measurement by the surveying device 1 are performed. When the measurement is completed, the designation of the next measuring point is transmitted to the assistant surveyor 72. Then, the moving of the assistant surveyor 72 to the measuring point and the measurement by the surveying device 1 are sequentially performed. Thus, the skilled surveyor programs the patterns for measurement in advance, and the measurement is executed in the navigation mode or in the auto-navigation mode. As a result, even an assistant surveyor without sufficient knowledge of surveying technique can perform the measurement and the cost of the measurement can be reduced.

Now, referring to FIG. 17 to FIG. 20, description will be given below on operation of the measuring system as described above. In the following description, it is assumed that there are two assistant measuring operators 72.

Figure 18:
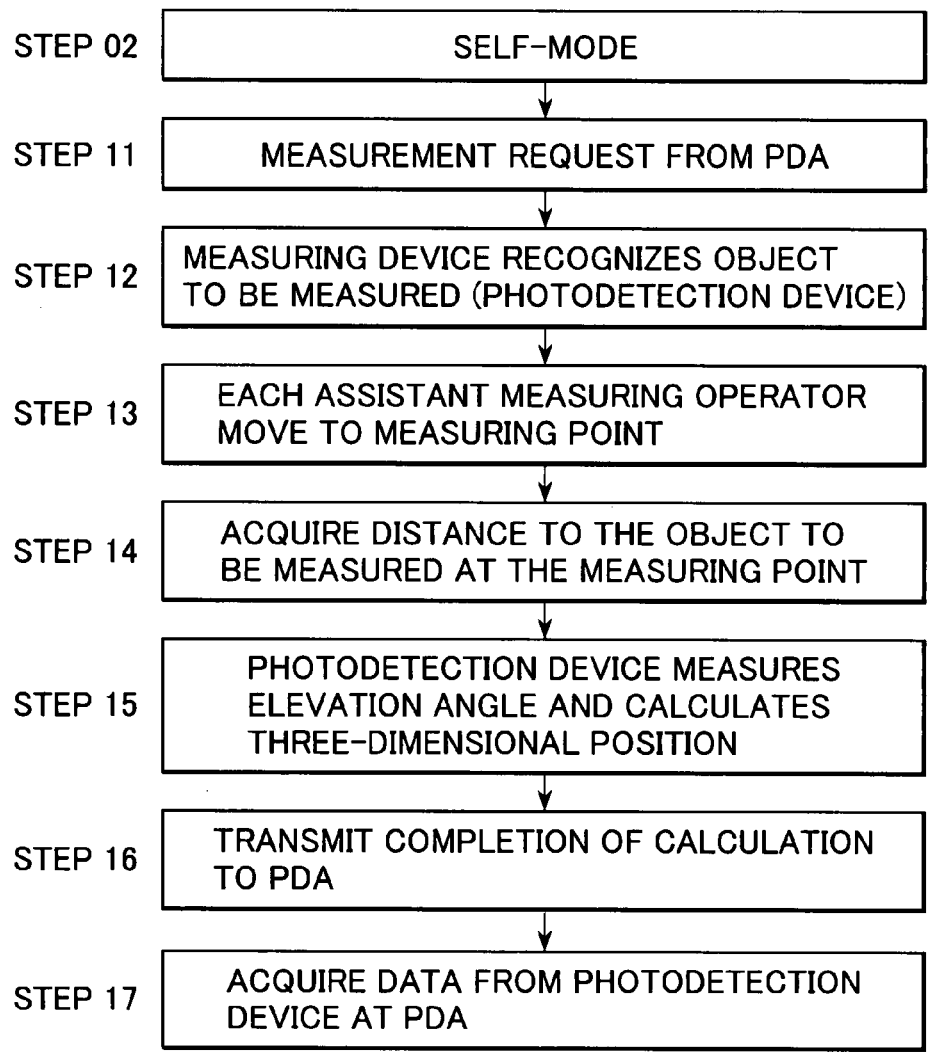
FIG. 18 is a flow chart to show a case where self-mode is selected.

First, referring to FIG. 18, description will be given on the self-mode.

The surveyor 71 selects self-mode (Step 02) by operating the self-mode selection button 81 on the main screen 116a of the PDA 73.

From the PDA 73, a measurement request is transmitted to the surveying device 1 (Step 11). Distance measurement by the surveying device 1 is started, and the surveying device 1 recognizes the object to be measured 2 (photodetection device 7) (Step 12).

The photodetection device 7 receives the result of the distance measurement at real time from the surveying device 1, and the result of the distance measurement is displayed on the photodetection side display unit 25. The assistant surveyor 72 confirms own position according to the displayed result of distance measurement and moves to the measuring point (Step 13).

In the case the position of the photodetection device 7 itself concurs with the position of the measuring point or is within allowable range (is conformed), the photodetection device 7 obtains a distance to the measuring point as distance measurement data (Step 14). By detecting the reference plane forming laser beam 5, the photodetection device 7 calculates an elevation angle with respect to the surveying device 1. Based on the distance measurement data and the elevation angle, three-dimensional position of the photodetection device 7 is calculated (Step 15).

When the calculation is completed at the photodetection device 7, a measurement completion signal is transmitted to the PDA 73 (Step 16). Upon receipt of the measurement completion signal, the PDA 73 identifies the photodetection device 7, which is transmitting the measurement completion signal, and among the measuring operator and the assistant measuring operator display units 80a, 80b and 80c, the corresponding display unit is lighted by flashing light.

The surveyor 71 recognizes that the measurement is completed at the measuring point of the site with flashing light among the measuring operator and the assistant measuring operator display units 80a, 80b and 80c and operates the corresponding button among the measuring operator and the assistant measuring operator designation buttons 84a, 84b and 84c. The self-mode sub-screen 116b is displayed. After confirming the content of measurement, the recording button 86 is operated, and the data is acquired (Step 17). When the data is acquired, the screen is turned back to the main screen 116a.

When surveying operation is completed on a measuring point, the assistant surveyor 72 moves to the next measuring point and continues to perform the surveying operation.

Figure 19:
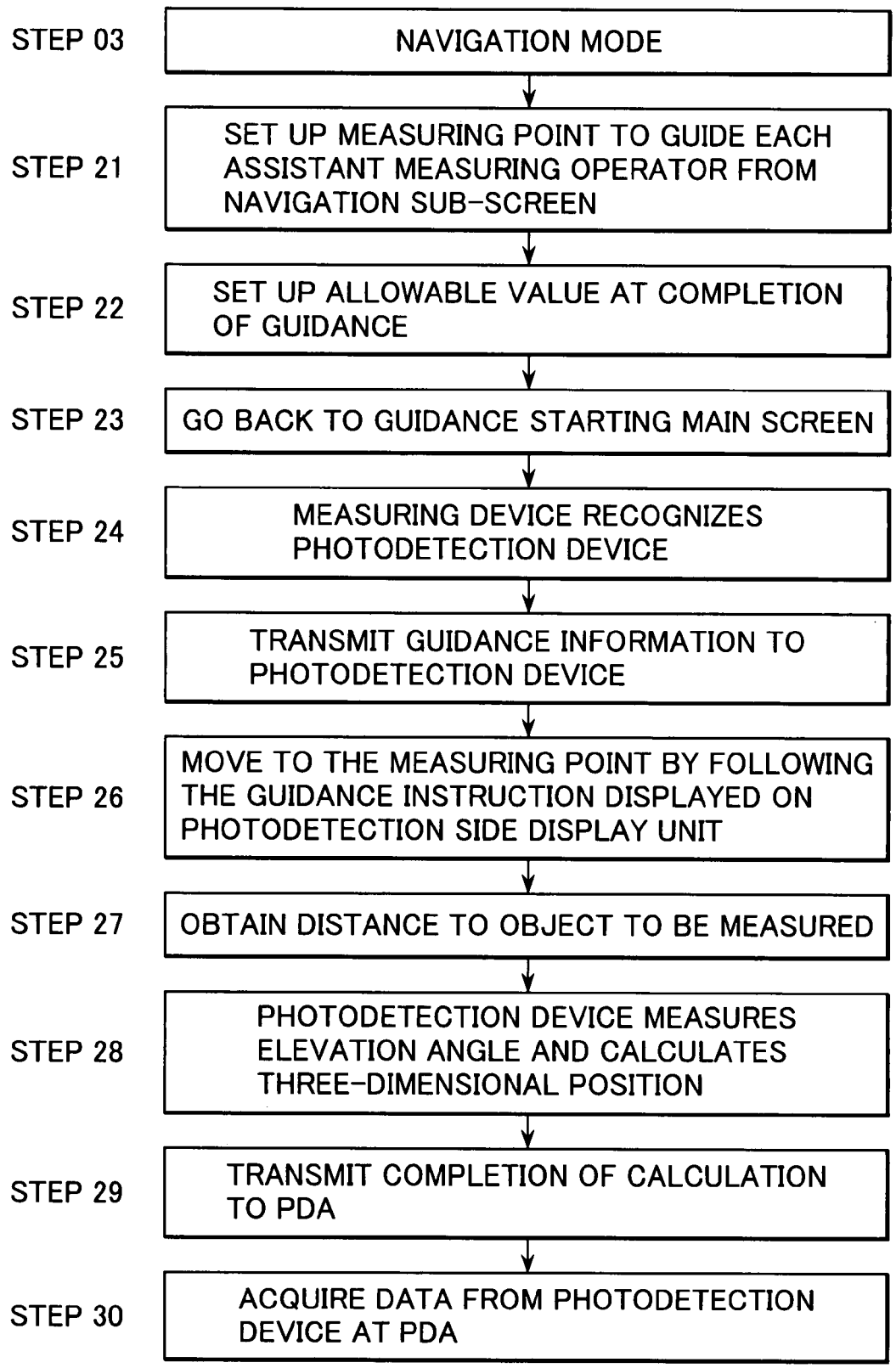
FIG. 19 is a flow chart when navigation mode is selected.

Next, referring to FIG. 19, description will be given on a case where the navigation mode is selected.

When the navigation mode is selected on the main screen 116a (Step 03), the navigation sub-screen 116c is displayed on the display unit 114 (see FIG. 14).

From the navigation sub-screen 116c, the information is inputted on the measuring point where the assistant surveyor 72 to be guided. For instance, identification number, position of the measuring point, and an allowable value with respect to the operation data at the completion of guidance (when the measuring point is decided) are set (Steps 21 and 22).

When the setting is completed, the guiding is started by operating the starting button 94. Then, the display on the display unit 114 is turned back to the main screen 116a (Step 23).

The surveying device 1 starts measurement and recognizes the photodetection devices 7 (Step 24).

From the PDA 73, guidance information corresponding to each of the photodetection devices 7 is transmitted, and the instruction receiving screen 25a is displayed on the photodetection side display unit 25 (Step 25).

During the course of guidance, position of the photodetection device 7 is continuously measured by the surveying device 1, and the result of measurement is transmitted at real time to the photodetection device 7. The photodetection device 7 compares the transmitted measurement result with the position of the measuring point in the guidance information and calculates the direction of guidance.

The surveying device 1 may transmit the information of the position of the photodetection device 7 thus measured to the PDA 73 at real time. Based on the measuring point and the position, guidance direction may be calculated at the PDA 73, and the result may be transmitted to the photodetection device 7 as a guidance signal.

Based on the calculation of the guidance direction, a part of the display unit 98 (shown by an arrow) corresponding to the guidance direction is lighted up on the instruction receiving screen 25a, and the assistant surveyor 72 moves to the direction shown by the lighted arrow. When the position of the photodetection device 7 under the guidance is within the range of the allowable value (when it is conformable), the completion display unit 99 is lighted up (turned on), and the completion of the guidance is notified to the assistant surveyor 72. Also, it may be so designed that the direction display unit 98 flashes on and off, and further the interval of flashing light may be shortened as the measuring point comes closer (Step 26).

The photodetection device 7 acquires the result of distance measurement at the conformance as the distance measurement data (Step 27).

By detecting the reference plane forming laser beam 5, the photodetection device 7 calculates an elevation angle with respect to the surveying device 1. Based on the distance measurement data and the elevation angle, three-dimensional position of the photodetection device 7 is calculated (Step 28).

When the calculation is completed, a completion signal to indicate the completion of the calculation is transmitted to the PDA 73 (Step 29).

Upon receipt of the completion signal, the PDA 73 identifies the photodetection device 7, from which the completion signal is issued, and the corresponding display unit is lighted by flashing light among the measuring operator and assistant measuring operator display units 80a, 80b and 80c (see FIG. 12). The surveyor 71 recognizes that the measurement of the measuring point at the site with flashing light has been completed among the measuring operator and assistant measuring operator display units 80a, 80b and 80c, and the corresponding button is pressed among the measuring operator and assistant measuring operator designating buttons 84a, 84b and 84c. The self-mode sub-screen 116b (see FIG. 13) is displayed. After confirming the content of measurement, the data is acquired by pressing the recording button 86 (Step 30). When the data is acquired, the screen is turned to the main screen 116a.

When the surveying is completed on one measuring point, the surveyor 71 performs guidance to the next measuring point.

Figure 20:
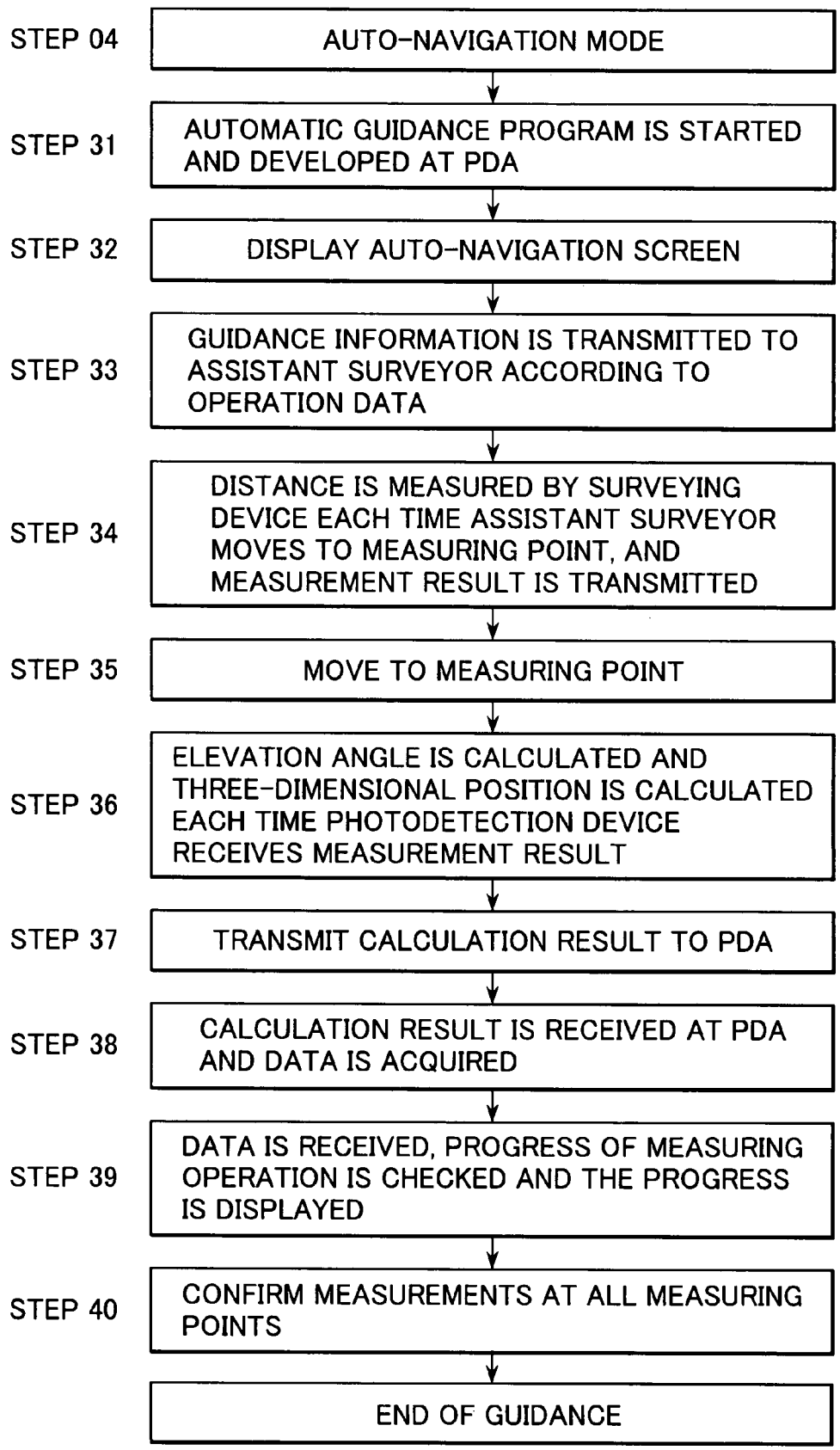
FIG. 20 is a flow chart when auto-navigation mode is selected.

Next, referring to FIG. 20, description will be given on a case where the auto-navigation mode is selected.

When the auto-navigation mode is selected on the main screen 116a (Step 04), automatic guidance program and operation data are called in the PDA 73, and the automatic guidance program is started and developed (Step 31). Also, the measurement by the surveying device 1 is started.

An auto-navigation screen 116d (see FIG. 16) is displayed on the display unit 114 (Step 32).

With the development of the automatic guidance program, guidance information is transmitted to the photodetection device 7 of the assistant surveyor 72 according to the operation data (Step 33). The instruction receiving screen 25a (see FIG. 15) is displayed on the photodetection side display unit 25.

During the course of guidance, the position of the photodetection device 7 is continuously measured by the surveying device 1 and the result of measurement is transmitted at real time to the photodetection device 7 (Step 34). The photodetection device 7 compares the transmitted measurement result with the received guidance information and calculates the direction of guidance.

On the instruction receiving screen 25a, a part of the display unit 98 (shown by an arrow) corresponding to the direction of guidance is turned on, and the assistant surveyor 72 moves in the direction shown by the lighted arrow. When the position of the photodetection device 7, which is receiving the guidance, comes within the range of the allowable value, the completion display unit 99 is turned on and the completion of the guidance is notified to the assistant surveyor 72. It may be so designed that the direction display unit 98 is lighted with flashing light, and the flashing interval may be shortened or the like as the photodetection device 7 comes closer to the measuring point (Step 35).

From the photodetection device 7, a guidance completion signal is transmitted to the surveying device 1. The distance measurement is performed on the photodetection device 7, and the result of the distance measurement is transmitted to the corresponding photodetection device 7 from the surveying device 1. By receiving the result of distance measurement from the surveying device 1 and by detecting the reference plane forming laser beam 5, the photodetection device 7 calculates an elevation angle with respect to the surveying device 1. Based on the result of distance measurement and the elevation angle, three-dimensional position of the photodetection device 7 is calculated (Step 36).

The three-dimensional position data thus calculated is transmitted to the PDA 73. Upon receipt of the data, the PDA 73 stores and collects the data in the storage unit 112 (Steps 37 and 38).

When the data is received, the PDA 73 checks the progress of the measuring operation based on the receipt, and the progress is displayed on the auto-navigation screen 116d (Step 39). By checking the progress, if any measuring point for which the guidance should be made is left, the guidance information on the next measuring point is transmitted to the photodetection device 7 and guidance operation is continued.

As the result of the checking of the progress, when the measurements on all of the measuring points have been completed, the automatic guidance program is terminated, and all guidance operations are completed (Step 40).

There may be one assistant surveyor or there may be three or more assistant surveyors.

What is claimed is:

1. A measuring system, comprising a surveying device installed at a known point, at least one photodetection device to be installed at a measuring point, and a main arithmetic device; wherein said surveying device comprises a laser beam projecting unit for projecting by rotary irradiation a reference plane forming laser beam including two or more fan-shaped laser beams with at least one of said fan-shaped laser beams tilted and a distance measuring light, a distance measuring unit for performing distance measurement by receiving a reflected distance measuring light from said photodetection device, and a radio communication unit for performing communication of the distance measurement data between said photodetection device and said main arithmetic device; wherein said photodetection device comprises a reflection unit for reflecting the distance measuring light toward said surveying device, a photodetection unit for receiving the reference plane forming laser beam, a photodetection side control arithmetic unit for calculating an elevation angle with respect to said surveying device based on a photodetection signal issued when the reference plane forming laser beam is received by said photodetection unit and for calculating an elevation position based on the elevation angle and the distance to said surveying device, a photodetection side radio communication unit for performing communication of distance measurement data and elevation position data at least with said main arithmetic device among said main arithmetic device and other photodetection devices; and wherein said main arithmetic device comprises a main radio communication unit being able to communicate at least with said photodetection device among said surveying device and said photodetection device, and a main storage unit for collecting and recording surveying data for each measurement point.

2. A measuring system according to claim 1, wherein said main arithmetic device has a main control arithmetic unit, wherein said main control arithmetic unit issues an instruction signal for starting measurement to said surveying device via said main radio communication unit and transmits position information of the measuring points to said photodetection device via said main radio communication unit.

3. A measuring system according to claim 2, wherein said photodetection device has a photodetection side display unit, wherein a guidance direction is displayed on said photodetection side display unit based on deviation of the measurement data of the photodetection device itself from the position information at the measuring point, and, when the position information of the measuring point conforms with the measurement data of the photodetection device itself, the distance measurement data and the elevation position data are transmitted to said main arithmetic device.

4. A measuring system according to claim 1, wherein said photodetection device receives distance measurement data transmitted from said surveying device at real time, and transmits the distance measurement data and the elevation position data to said main arithmetic device when the received distance measurement data conforms with the position information.

5. A measuring system according to claim 1, wherein said main arithmetic device has a main control arithmetic unit, wherein operation data is stored in said main storage unit, said main control arithmetic unit transmits a guidance information to said photodetection device based on the position information of the measuring point obtained from operation data and the result of distance measurement of said photodetection unit measured by said surveying device, and a guidance direction is displayed on a photodetection side display unit of said photodetection device.

6. A measuring system according to claim 1, wherein said main arithmetic device can select a first mode, a second mode, and a third mode; and in said first mode, an instruction signal for starting measurement is issued to said surveying device via said main radio communication unit, a position information at the measuring point is transmitted to said photodetection device via said main radio communication unit, said photodetection device receives distance measurement data transmitted from said surveying device at real time, and the distance measurement data and the elevation position data are transmitted to said main arithmetic device when the received distance measurement data conforms with the position information;

in said second mode, an instruction signal for starting measurement is issued to said surveying device via said main radio communication unit, a position information of the measuring point is transmitted to said photodetection device via said main radio communication unit, a guidance direction is displayed on a photodetection side display unit of said photodetection device based on deviation of the measurement data of said photodetection device itself from the position information of the measuring point, and, when the position information of the measuring point conforms with the measurement data of said photodetection device itself, the distance measurement data and the elevation position data are transmitted to said main arithmetic device; and in said third mode, operation data is stored in said main storage unit, and a guidance information is transmitted to said photodetection device based on the position information of the measuring point obtained from the operation data and the result of distance measurement of said photodetection device determined by said surveying device, and a guidance direction is displayed on said photodetection side display unit.

7. A measuring system according to claim 1, wherein said surveying data comprises distance measurement data.

8. A measuring system according to claim 1, wherein said surveying data comprises elevation position data.

* * * * *